Patented Nov. 3, 1953

2,658,075

UNITED STATES PATENT OFFICE 2,658,075

PROCESS FOR PREPARING CARBOXYLIC ACIDS AND THEIR ANHYDRIDES

Walter Reppe and Walter Schweckendiek, Ludwigshafen (Rhine), and Hugo Kroeper, Heidelberg, Germany, assignors to Badische Anilin- & Soda-Fabrik Aktiengesellschaft, Ludwigshafen (Rhine), Germany No Drawing. Application April 16, 1952, Serial No. 282,687

Claims priority, application Germany April 27, 1951

8 Claims. (Cl. 260—533)

1

The present invention relates to the production of carboxylic acids and their anhydrides by the carbonylation of olefinic hydrocarbons in the presence of water or carboxylic acids, and more particularly to the manufacture of aliphatic carboxylic acids and their anhydrides by the said carbonylation method in the presence of a specific type of carbonylation catalyst.

It is well known that carboxylic acids or their functional derivatives may be obtained by treating olefins with carbon monoxide and compounds containing a replaceable hydrogen atom, such as water, alcohols, mercaptans, ammonia or primary or secondary amines or carboxylic acids. This process is generally called carbonylation. More recent investigations of this carbonylation reaction have shown that nickel and its compounds are particularly efficient catalysts for the carbonylation of olefins to carboxylic acids and their functional derivatives (see Walter Reppe, Neue Entwicklungen auf dem Gebiet der Chemie des Acetylens und Kohlenoxyds, Springer-Verlag, 1949).

It is an object of our invention to improve the said carbonylation method by providing a novel type of carbonylation catalyst. Other objects of our invention will be seen more clearly from the following description.

We have found, and that constitutes an object of our invention, that complex nickel compounds containing organic substituted amines or phosphines in complex combination have a marked superiority in catalyzing the reaction between olefins, carbon monoxide and compounds with a replaceable hydrogen atom. In particular these complex nickel compounds act as if they would be converted in situ into nickel carbonyl which is the well known established catalyst for these carbonylations. However, though these compounds act like nickel carbonyl they are not definitely converted into this compound and, therefore, remain active for a long time. Nickel carbonyl itself is a relatively volatile compound and is removed from the reaction zone by the compounds formed in the carbonylation. In contrast thereto, the catalysts used according to our invention are not converted into volatile nickel compounds so that they will be found unchanged after the reaction products and the excess starting materials and eventually the solvents have been removed from the reaction product.

The complex nickel compounds used according to our invention may be nickel salts derived from organic acids, such as acetic acid, propionic acid or valeric acid. Of these salts we prefer to use a nickel salt of the acid to be formed in the course of the carbonylation reaction. If, for example, we manufacture propionic acid or its anhydride by the interaction of ethylene, carbon monoxide and water or propionic acid, respectively, we prefer to use a complex nickel salt derived from nickel propionate. We might as well use complex compounds derived from nickel acetate or nickel valerate or any other nickel salt, but in the course of the reaction at least part of this salt would be converted into the propionate anyway. Other nickel salts which may be used according to our invention are the complex salts derived from nickel halides, nickel cyanide or nickel rhodanide. We may use as catalysts instead of a complex nickel salt a complex nickel carbonyl, i. e. nickel carbonyls, wherein one or more CO-groups are replaced by an amine or phosphine.

Among the organic substituted amines and phosphines which are in complex combination with the nickel in our catalysts, we prefer to use those derived from tertiary amines and phosphines. To cite a few examples of such tertiary compounds, we refer to pyridine and its homologues, trialkyl amines, tetraalkyl diamino alkanes, benzyl methyl aniline and similar tertiary amino compounds. The specific tertiary amine used is not essential. However, we prefer that the amine is free from any groups which might interfere with the course of the reaction. Simple amines, containing in addition to the nitrogen atom or atoms only carbon, hydrogen and eventually oxygen atoms, are preferred. Tertiary phosphines which may be used for preparing our catalysts may be trialkyl, triaralkyl and triaryl phosphines, such as isobutyl phosphine, tribenzyl phosphine or tritoluyl phosphine. These phosphine radicals may be either in complex combination with a nickel salt of the type referred to above or with a nickel carbonyl, replacing therein one or more of the CO-groups. Instead of using complex amine or phosphine nickel compounds, as referred to above, we may also use mixtures thereof.

The catalysts may be prepared by simply heating together the constituents thereof, for example a mixture of nickel propionate with pyridine, a mixture of nickel propionate with triphenyl phosphine or a mixture of nickel carbonyl with triphenyl phosphine.

It is not necessary to start the carbonylation of the olefins in the presence of the ready-made catalyst. They may very efficiently be allowed to form in situ by just adding the various constituents of the catalyst to the starting mixture. If, for example, preparing propionic acid or its anhydride by the carbonylation of ethylene, we may simply add pyridine or triphenyl phosphine or the like, on the one hand, and nickel salt, such as nickel acetate, on the other hand, to the propionic acid or water or mixtures of both, and then treat it with ethylene and carbon monoxide.

We prefer to carry out the carbonylation in the liquid phase. We may work batchwise by just pressing carbon monoxide or a mixture of carbon monoxide and the olefin to the water or carboxylic acid or the aqueous carboxylic acid admixed with the catalyst, while heating to reaction temperatures, usually to between 180 and 300° C. The end of the reaction may be easily seen from the fact that the gas is no longer absorbed. We prefer to work under a pressure exceeding 50 atmospheres, preferably between 150 and 300 atmospheres. We may work at higher pressures if the necessary equipment is available.

The reaction may also be carried out continuously, for example by allowing a solution of the catalyst in water or a carboxylic acid to trickle through a column charged with distributing bodies, while leading carbon monoxide or a mixture of this with an olefin in countercurrent to the solution. We may also work continuously by leading the starting materials in direct current through a suitable high pressure vessel. In all cases we may use additional solvents, such as saturated hydrocarbons or the reaction products themselves or other inert solvents, such as carboxylic acid esters, lactones and the like.

The olefinic hydrocarbons used as starting materials may be admixed with saturated hydrocarbons. The reaction is appliable not only to gaseous hydrocarbons, such as ethylene, propylene and butylenes, but also to higher olefinic hydrocarbons, such as octene, octadecene or mixtures of such hydrocarbons as they are obtained by cracking paraffin wax or by the synthesis of hydrocarbons from carbon monoxide and hydrogen. While we prefer to work with an olefin: carbon monoxide ratio of about 1:1, it is also possible to use other ratios, such as 0.5:1 or 1:0.5 or even lower than that.

As already mentioned, the main advantage of the catalysts used according to our invention resides in the possibility of using them repeatedly. The recovery of the catalyst is so simple that, for example in the conversion of ethylene, carbon monoxide and water to propionic acid in the presence of complex nickel propionate-tertiary amine, it is only necessary to distill off from the reaction mixture propionic acid or its anhydride and to use the distillation residue without further purification for a new batch. Small nickel losses may be made up by adding a small amount of fresh nickel salt solution. When after repeated use of the catalyst there is a certain build-up of organic by-products, the catalyst may be easily purified by boiling the residue with water or dilute propionic acid, withdrawing the solution thus obtained and using it again.

The following examples will further illustrate how our invention may be carried out in practice.

*Example 1*

A stirring autoclave of 1 liter made from copper is charged with 100 grams of 20 per cent aqueous propionic acid, 6 grams of nickel acetate, 5 grams of pyridine and 5 grams of triphenyl phosphine. The whole is then heated to 230° C. while pressing in a mixture of equal parts by volume of ethylene and carbon monoxide. The reaction proceeds, while the pressure is maintained, by continuously replenishing the gas mixture. In the course of 5 hours a total of 500 atmospheres of the gas mixture has been absorbed. The autoclave is allowed to cool, the pressure released and the reaction liquid withdrawn. It shows an increase in weight by 300 grams. By distillation of the reaction product 390 grams of a mixture containing 85 per cent of propionic acid and 15 per cent of propionic acid anhydride are obtained. The distillation residue consists of 7 grams, after extracting the catalyst with water. The aqueous solution of the catalyst may be used for another batch.

*Example 2*

In the manner describe in Example 1 a mixture of 100 grams of 10 per cent aqueous propionic acid, 6 grams of pyridine and 5 grams of nickel propionate are treated with ethylene and carbon monoxide at 240° C. under 200 atmospheres pressure. In the course of 7 hours a total of 345 atmospheres of the gas mixture has been consumed. The increase in weight amounts to 230 grams. By a distillation of the crude reaction product 315 grams of a distillate consisting of 89 per cent of propionic acid and 11 per cent of propionic acid anhydride are obtained. The residue contains in addition to the complex nickel salt 3 grams of higher molecular by-products. The catalyst may be used four times without losing its activity and without adding fresh nickel salt.

*Example 3*

148 grams of propionic acid and 10 grams of the complex salt formed from pyridine and nickel propionate are heated in a copper or silver-lined rotating vessel at 220° C. with a mixture of equal amounts of carbon monoxide and ethylene for 8 hours. The reaction product contains 73 per cent of propionic acid anhydride and 26 per cent of propionic acid which may be separated by distillation. The distillation residue may be used for another batch without purification.

*Example 4*

A mixture of 200 grams of propionic acid with 10.3 grams of triphenyl phosphine nickel carbonyl [$(C_6H_5)_3$ P]Ni(CO)$_3$ is treated for 6 hours in a rotating autoclave lined with silver with a mixture of carbon monoxide and ethylene in the ratio of 0.8 to 1 at 220° C. The reaction product contains 32.5 per cent of propionic acid, 61 per cent of propionic acid anhydride and a small amount of by-products.

*Example 5*

A mixture of 56 grams of n-butylene, 18 grams of water and 20 grams of triphenyl phosphine nickel carbonyl is treated in a stainless steel rotating autoclave for 10 hours with carbon monoxide under 200 atmospheres pressure. After driving off the excess butylene, the distillation of the reaction mixture yields 26 grams of valeric acid.

We claim:

1. A process for the manufacture of saturated aliphatic carboxylic acids and their anhydrides which comprises heating a monoolefinic aliphatic hydrocarbon together with a saturated aliphatic monocarboxylic acid to temperatures between about 180° and 300° C. in the presence of a nickel salt of said acid which contains in complex combination a tertiary organic base selected from the group consisting of pyridine and triphenyl phosphine, while maintaining a carbon monoxide pressure of at least 100 atmospheres.

2. A process for the manufacture of saturated aliphatic carboxylic acids and their anhydrides which comprises heating a monoolefinic aliphatic hydrocarbon together with a saturated aliphatic monocarboxylic acid to temperatures between about 180° and 300° C. in the presence of a nickel salt of said acid which contains in complex combination pyridine, while maintaining a carbon monoxide pressure of at least 100 atmospheres.

3. A process for the manufacture of saturated aliphatic carboxylic acids and their anhydrides which comprises heating a monoolefinic aliphatic hydrocarbon together with a saturated aliphatic monocarboxylic acid to temperatures between about 180° and 300° C. in the presence of a nickel salt of said acid which contains in complex combination triphenyl phosphine, while maintaining a carbon monoxide pressure of at least 100 atmospheres.

4. A process for the manufacture of propionic acid and its anhydride which comprises heating ethylene together with propionic acid to temperatures between about 180° and 300° C. in the presence of nickel propionate containing in complex combination a tertiary organic base selected from the group consisting of pyridine and triphenyl phosphine, while maintaining a carbon monoxide pressure of at least 100 atmospheres.

5. The process as set forth in claim 4, wherein nickel propionate containing triphenyl phosphine in complex combination is used.

6. The process as set forth in claim 4, wherein complex pyridino nickel propionate is used.

7. A process for the manufacture of propionic acid and its anhydride which comprises heating ethylene together with aqueous propionic acid to temperatures between about 180° and 300° C. in the presence of nickel propionate containing in complex combination a tertiary organic base selected from the group consisting of pyridine and triphenyl phosphine, while maintaining a carbon monoxide pressure of at least 100 atmospheres.

8. The process as set forth in claim 7, wherein complex pyridino nickel propionate is used.

WALTER REPPE.
WALTER SCHWECKENDIEK.
HUGO KROEPER.

References Cited in the file of this patent

UNITED STATES PATENTS

| Number | Name | Date |
| --- | --- | --- |
| 2,422,631 | Olin et al. | June 17, 1947 |
| 2,422,632 | Olin et al. | June 17, 1947 |
| 2,448,368 | Gresham et al. | Aug. 31, 1948 |
| 2,448,375 | Larson | Aug. 31, 1948 |
| 2,497,304 | Gresham et al. | Feb. 14, 1950 |
| 2,510,105 | Hedberg | June 6, 1950 |
| 2,540,736 | Kalb et al. | Feb. 6, 1951 |
| 2,542,766 | Gresham et al. | Feb. 20, 1951 |
| 2,549,453 | Gresham et al. | Apr. 17, 1951 |
| 2,593,440 | Hagemeyer | Apr. 22, 1952 |

OTHER REFERENCES

Reppe, "Acetylene Chemistry," P. B. 18852-S, pp. 180, 191, 194 (1949).